Figure 1:
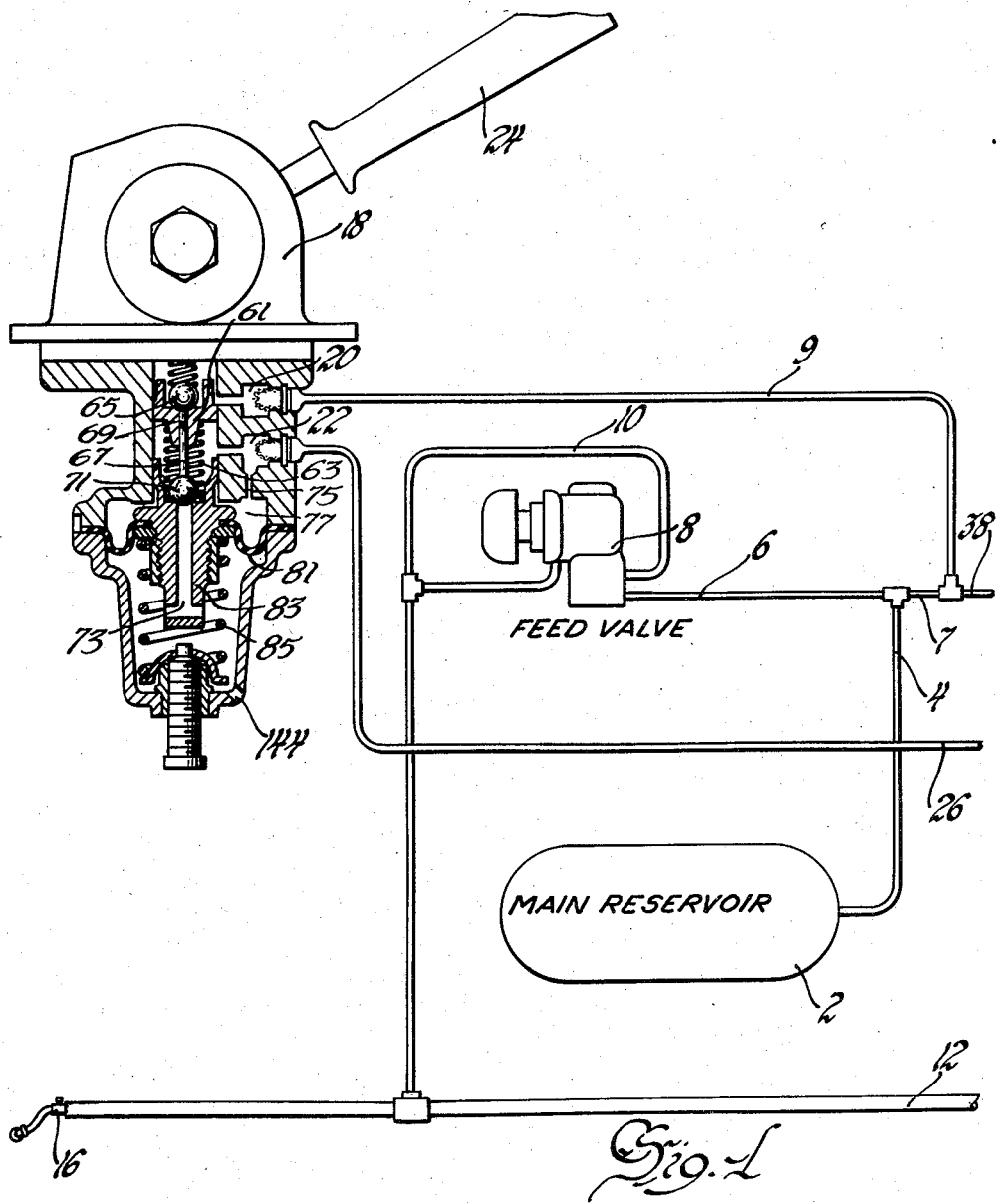

Jan. 27, 1959     K. D. SWANDER, JR     2,871,063
BRAKE SYSTEM

Filed Aug. 30, 1955     3 Sheets-Sheet 1

Inventor
Kenneth D. Swander, Jr.
By
J. C. Thorpe
Attorney

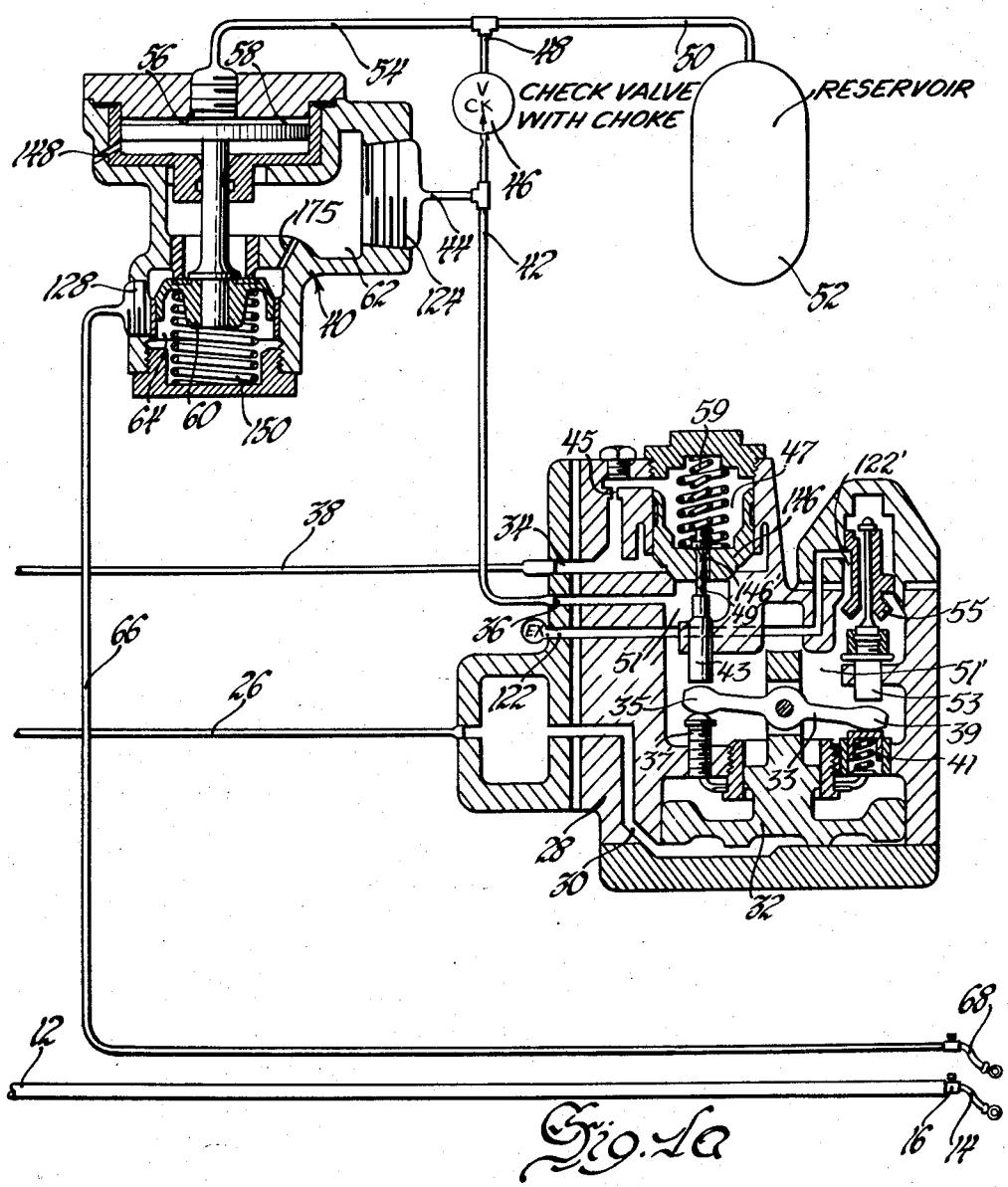

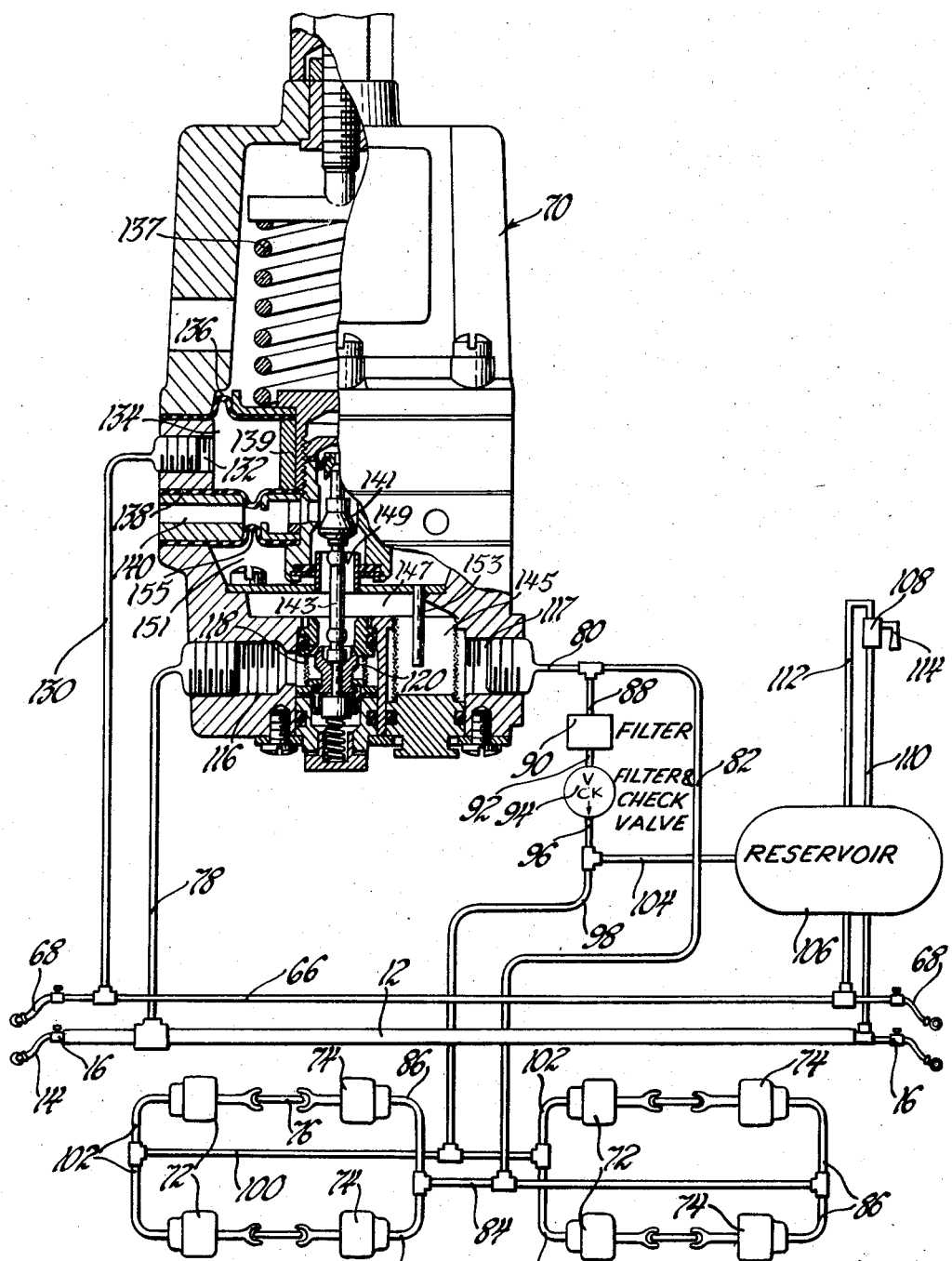

United States Patent Office 2,871,063
Patented Jan. 27, 1959

2,871,063

BRAKE SYSTEM

Kenneth D. Swander, Jr., La Grange, Ill., assignor to General Motors Corporation, Detroit, Mich., a corporation of Delaware Application August 30, 1955, Serial No. 531,315

2 Claims. (Cl. 303—26)

This invention relates generally to braking systems and more particularly to braking systems of the fluid type primarily adapted for use with a series of connected vehicles such as those of a railroad train.

With the advent of lightweight trains there is an increasing need for a braking system whose equipment may be kept to a minimum so as to minimize that part of the weight of the train made up by the braking equipment. Furthermore, with the increased speeds involved with the use of such light trains it is necessary that the braking equipment be more quickly responsive to operation by the train engineer.

Prior train airbrake systems include numerous accessories and an assortment of devices which make them heavy and cumbersome and poorly suited to lightweight trains. In addition, these prior systems basically retain the idea of using a single trainline pipe which acts as both a supply and control pipe. As a result of this use of a single pipe, after a heavy application of the brakes of the train has been made, it is necessary to recharge the pipe for the length of the train before adequate control and braking is again readily available. Also in prior constructions it is common practice to provide a single airbrake cylinder which is mechanically coupled to the brake lever so as to apply the brakes. This has not always proven satisfactory because of the fact that the rigging sometimes tends to hang against the wheel thereby increasing both brake shoe and wheel wear.

The present invention has been developed to overcome the above difficulties by providing an extremely simple but unique airbrake system in which a relatively large trainline supply pipe is used which is charged at all times along the complete length of the train. The proposed new system has a separate control pipe which also extends along the length of the train which is of relatively small diameter so that it is much more easily charged and so that relatively small pressures can be used therein to control the brake rigging of the system without the need for the relatively high pressures and volumes in the trainline supply pipe which are necessary to actuate the mechanical portions of the rigging.

It will be appreciated shortly that the present invention readily lends itself to the safety requirements normally demanded of such systems and with the addition of a unique time delay means it is capable of being operated from any point on the train with the same facility as prior brake systems and without the attendant additional structure and lack of response of such prior systems.

For a more complete understanding of the brake system and the aims and objective achieved thereby reference may be had to the accompanying detailed description and drawings, in which:

The figures labeled Fig. 1, Fig. 1a and Fig. 1b actually represent, when compositely placed side by side, a schematic diagram of the entire system including the locomotive brake operating components (Figs. 1 and 1a) and one car (Fig. 1b).

Referring now to these three figures, the system comprises a main reservoir 2 which is actually supplied by air under pressure from a usual compressor (not shown). This main reservoir which is under relatively high pressure, as for example, 140 lbs., is connected by means of suitable conduits 4 and 6 to a feed valve 8 which may be regulated to reduce the pressure of the main reservoir within a given range. The feed valve 8 is typical of air brake feed valves in common use today and if further information regarding the feed valve is desired reference is made to Instruction Pamphlet No. 64 entitled "The F–6–Type Feed Valves Operation and Maintenance" published by the New York Airbrake Company, New York, New York.

The output of the feed valve 8 passes through the conduit 10 at some reduced pressure, say 90 p. s. i., and is fed to the trainline supply pipe 12 which extends the length of the train which, as already mentioned, in this case comprises a locomotive schematically shown by Figures 1 and 1a and a single car shown by Figure 1b. As indicated at 14 a suitable coupling or connection is provided between the locomotive and the car so as to continuously maintain the pipe 12. The pipe 12 is of relatively large diameter and assuming no leakage and a proper setting of cocks such as those indicated by the numeral 16 will be maintained at a substantially constant pressure, i. e., in the example given, 90 p. s. i., throughout its length by means of the feed valve 8.

Also supplied from the main reservoir 2 by means of the conductors 4, 7 and 9 is an engineer's brake valve 18. This valve although shown in some detail also represents a well-known component of prior brake systems and no detailed description is deemed necessary with respect thereto. It should be mentioned, however, that the brake valve 18 does have an inlet 20 and an outlet 22 which when the brakes are off or "released" are not connected together but which when the handle 24 is actuated to any of a series of brake application positions other than off connects the inlet 20 to outlet 22 and operates in a manner which normally substantially reduces the pressure supplied to the outlet 22 below that supplied by the main reservoir 2. In other words, the operator's brake valve 18 is operated to apply and release the brakes but because of its well-known structure also acts as a pressure reducing valve. Brake valve 18 so far as this invention is concerned operates as follows: When handle 18 is moved to any of a plurality of brake application positions a cam connected thereto causes member 61 to move downwardly against the action of a spring 63. Downward movement of member 61 unseats inlet ball check 65 since it is connected by a rod 67 extending through passage 69 to exhaust ball check 71 normally closing exhaust passage 73 leading to exhaust port 144. When ball check 65 is unseated by movement of handle 24 air may flow from inlet 20 through passage 69 to outlet 22. However, air may also flow through small choke passage 75 to chamber 77 above diaphragm 81. Air pressure against diaphragm 81 will cause member 83 to move downwardly against spring 85 until ball check 65 again seats cutting off the supply of further air pressure to outlet 22 and chamber 77 and a balanced condition is achieved for the particular brake handle setting. If it is desired to release the brakes after brake valve 18 has been operated as described above to apply the brakes, the handle 24 is returned to its release or running position. The member 61 because of spring 63 will then move upwardly carrying ball checks 65 and 71 thereby uncovering passage 73 so that air can flow therethrough from outlet 22 to exhaust port 85. Ball check 65 will remain seated. As air is exhausted from pipe 26 through outlet 22 and exhaust passage 73 and port 144 air will also be exhausted from chamber 77 allowing member 83 to move upwardly under the action of spring 85 until ball check 71 is again seated. The outlet 22 of this brake valve 18 is connected by means of a conductor or conduit 26 to another valve 28 located on the locomotive which also constitutes a well-known item of prior brake systems and which is commonly known in the art as the B3A relay valve. Consequently, its operation in the present system will be treated only insofar as it is necessary for proper functioning of the present invention. The relay valve 28 relays the application and release operation of the brake valve 18 to the control pipe 66 to thereby establish the pressures therein which operate the reverse relays 70 on each of the cars to apply the brakes of the associated car in a manner which will appear more fully later. The operation of relay 28 is as follows. When a brake application is made with brake valve 18, air under pressure is supplied via pipe 26 to the under-face of piston 32 causing it to move upwardly. A lever 33 pivotally mounted on the piston 32 moves upwardly therewith and has an end 35 which pivots on adjusting screw 37 and an end 39 which pivots on spring loaded plunger 41. The end 35 of lever 33 acts against the stem 43 of application valve 146. Upon small upward movements of piston 32 and lever 33 valve 146′ is unseated against biasing action of spring 59 and pipe 42 is connected to pipe 38 via passage 34, choke 45, chamber 47, passage 49 (which loosely surrounds the necked down portion of stem 43) and chamber 51. Upon large movements of end 35 valve 146 is unseated and pipes 38 and 42 are directly connected via chamber 51. At approximately the same time that pipe 38 leading from feed valve 8 is connected to pipe 42 by upward movement of (actually slightly before due to arrangement of lever 33) exhaust valve stem 53 is moved upward by arm 39 so that exhaust valve 55 closes off passage 122 leading to the atmosphere which formerly was connected to pipe 42 via chamber 51, chamber 51a and passage 122′. It will thus be appreciated from the foregoing that relay 28 serves to connect pipe 42 to pipe 38 (leading from the feed valve) and to cut off pipe 42 from the atmosphere during a brake application with brake valve 18. This valve 28 is piloted by operation of the handle 24 of the brake valve 18 which when moved from the off or brake release positions to any of a plurality of brake application positions will supply air through the conductor 26 into a passage 30 communicating with the underside of a piston 32. Upward movement of piston 32 in the air relay 28 as viewed in Figure 1a will connect the inlet 34 of the relay 28 with its outlet 36. It will be observed, however, upon reference to Figures 1 and 1a that the main reservoir 2 is connected via the conductors 4, 7 and 38 to the inlet 34 of the relay 28. Relay 28 also acts as a pressure reducing valve and supplies air at a reduced pressure when piloted by the brake valve 18 through the conductor 26 to a valve indicated generally by a numeral 40, through conductors 42 and 44.

Air is also supplied from the main reservoir through the conductors 4, 7 and 38 and the air relay 28 at reduced pressure and through the conductor 42 and a one-way check valve 46 with a suitable choke via the conductors 48 and 50 to a small volume reservoir 52. This same air leaving the relay 28 and passing through the conductor 42, check valve 46 and conductor 48 also enters via a conductor 54 an upper chamber 56 provided in the valve 40. The air in the upper chamber 56 being under pressure acts against the face of a piston 58 to unseat valve 60 of valve assembly 40 so that air may be supplied through the valve assembly 40 via chambers 62 and 64 into a trainline control pipe 66 which is of relatively small diameter when compared with the trainline supply pipe 12 and which also extends the length of the train. Trainline supply pipe 66 is also suitably interconnected between the various cars and in this case between the locomotive and the car by means of suitable couplings or connections 68 similar to those indicated at 14. The trainline control pipe 66 which is to be considered more fully in a description of the operation of the device is normally exhausted, i. e., connected to atmosphere, through the valve assembly 40 and the aforementioned piping or conductor connecting assembly 40 with the relay 28.

Each car of the train is typically illustrated by Figure 1b and includes a reverse relay indicated generally by a numeral 70. This relay is a standard type currently available on the open market whose construction and operation are well known and which consequently will receive no detailed elucidation here other than what is deemed necessary to clearly understand its function in the present invention.

The purpose of relay 70 is to supply air therethrough from trainline supply pipe 12 via pipe 78 to pipe 80 and application and release brake cylinders 72 and 74, respectively, when there is no air pressure in control pipe 66 and pipe 130 and to exhaust air from pipe 80 and 82 (leading from release cylinders 74) in proportion to the pressure in control pipe 66 and pipe 130. This is accomplished as follows: Assume a certain air pressure has been supplied to pipe 66 and pipe 130 after the brake system is fully charged. Air pressure will then be supplied to chamber 134 through port 132 loading diaphragm 136 and causing it to move upwardly against the action of spring 137. Diaphragm 137 when it moves upwardly will carry along with it assembly 139 thereby unseating exhaust valve 141 and seating supply valve 120 since valves 141 and 120 are connected together by linkage 143. The seating of valve 120 cuts off any further supply of air to the brake cylinders 72, 74. The unseating of exhaust valve 141 allows air to exhaust from release brake cylinders 74 through piping 82, 80, chambers 145, 147, passage 149, past exhaust valve 141 to exhaust ports 140. As air is being exhausted from release cylinders 74 it is also being exhausted from chamber 151 via tube 153 connecting chamber 151 with chamber 145. The drop in pressure in chamber 151 occurring as a result of air flow therefrom reduces the pressure acting on diaphragm 155 and allows member 139 to move back down under the influence of spring 137 until exhaust valve 141 is again seated and a balanced condition is obtained between spring 137 and the pressures in chambers 134 and 151 acting against the diaphragms 136, 155. Thus it will be appreciated for each pressure increase in pipes 66 and 130 and chamber 134 there will be a corresponding decrease in the pressure in release brake cylinders 74. Conversely, if, after a brake application is made, i. e., pressure is supplied to chamber 134, a partial or complete release of brakes may be achieved by reducing the air pressure in chamber 134 via piping 130 and 66. For example, if after an application as described above, the pressure is reduced in chamber 134 by venting pipe 66, spring 137 will cause assembly 139 to move downwardly carrying with it exhaust valve 141. However, since supply valve 120 is connected to exhaust valve 141 by linkage 143, supply valve 120 will again open allowing air to be supplied to brake cylinders 74. If all air pressure is exhausted from chamber 134 then supply valve 120 will remain open. If chamber 134 is only partially exhausted, however, then the pressure build-up in chamber 151 will eventually cause supply valve 120 to close again creating a balanced condition.

In addition to the reversing relay 70 each car is provided with the afore-mentioned oppositely disposed brake cylinders 72 and 74 to actuate the mechanical brake equipment for each wheel. The arrangement of these cylinders is believed to be unique although the individual construction of such cylinders is typical in that they contain the usual chamber and actuated piston which needs no further mention here. As indicated in Figure 1b, each set of cylinders 72, 74 controls a brake lever 76 for applying the brake shoes to the wheels when moved to the right as viewed in Figure 1b. All the cylinders 74 are adapted to be supplied through the reverse relay 70 from the trainline supply pipe 12 via conductors 78, conductors 80, 82, 84 and 86. All of the cylinders 72 are also supplied from the brake pipe 12 through the conductors 78, 80 and 88, filter 90, conductor 92, a filter and check valve assembly 94 and conductors 96, 98, 100, 102. Also charged along with the cylinders 72 through conductor 78 and reverse relay 70 and conductors 80, 88, filter 90, conductor 92, filter and check valve 94 and conductor 96 via a conductor 104 is a volume reservoir 106.

At the extreme end of the car shown in Figure 1b is a so-called "backup valve" 108 which also could be considered a conductor's valve for connecting the train line brake supply pipe 12 to the control pipe 66 so that a brake application can be made from the cars at any point along the train depending on the location of this valve. This valve which is connected across the supply pipe 12 and control pipe 66 by the piping 110 and 112 is normally closed so as to prevent any communication between these two pipes 66 and 12 but which upon actuation of the handle 114, as already mentioned, can be made to connect these two pipes together. The operation of the system is as follows:

*A brake application by the engineer using the brake valve*

Assuming the train supply pipe 12 to be fully charged by the feed valve 8 and assuming the brake valve 18 to be in the released position, which in this instance may be considered the same as the running position, air will be supplied by means of the brake pipe 12 through the reverse relay into both the application cylinders 72 and the release cylinders 74 as follows: The system should be charged as follows: air flows from pipe 12 up through pipe 78 into the inlet 116 through filter screen 118 past the supply valve 120 and from there through the output connection 117 and thence through the piping and elements previously described so as to equally charge both the application cylinders 72 and the release cylinders 74 and thereby maintain the levers 76 properly between the application and release cylinders so that the brakes are released. If the engineer now moves the handle 24 of the brake valve 18 air will be supplied by this brake valve through the conductor 26 to the air relay 28. This relay 28, as already mentioned, is piloted by the brake valve 18 and upon air pressure being supplied thereto will cause the exhaust valve 55 to move upwardly so as to close off the exhaust port 122 and unseat valves 146 and 146' to connect the inlet 34 to the outlet 36. With inlet 34 connected to outlet 36, air from the main reservoir may be supplied through the pipe 42, the pipe 44 and port 124 in valve assembly 40 into chamber 62 of valve assembly 40. Pressure in chamber 56 acting on piston 58 will unseat valve 60 and allow a large volume of air to flow past valve 60 through the outlet 128 of valve assembly 40 into the brake control pipe 66. Air under pressure supplied control pipe 66 is communicated via pipe 130 to port 132 and into a chamber 134 of the reversing relay 70. This air is the signal or loading air which loads the main diaphragms 136, 138 so as to regulate this reverse relay. Because of the construction of the reverse relay 70 each increase in loading or signal pressure in the chamber 134 results in a corresponding decrease in output pressure through the output port 117. Any ratio desired may be achieved by adjustment and regulation of this reverse relay in a well-known way. Since the air entering the inlet 116 of the reverse relay 70 is at the pressure determined by the feed valve 8 the pressure in the outlet 117 in the reverse relay will be less than feed valve pressure due to the presence of signal or loading air in the chamber 134. Actually, what happens is that the relay 70 exhausts a portion of the air through the exhaust port 140 from release cylinders 74. Since the air in the application cylinders 72 is trapped by the presence of the check valve 94 there will be no flow out of these application cylinders nor out of the reservoir 106. Air will, however, flow out of the release cylinders 74 through the piping 84, 82, 80 and exhaust port 140 of relay 70 as previously described so as to reduce the pressure in these release cylinders. This will result in an unbalance of forces between the application and release cylinders on the levers 76 causing levers 76 to move to the right as viewed in Figure 1b thereby accomplishing a brake application. Reservoir 106 is a large volume reservoir which has been provided to minimize the slight loss of pressure in the application brake cylinders 72 due to their piston movement upon an application of the brakes caused by air being exhausted from the release cylinders 74. It should be mentioned at this time (refer to Figure 1a) that while the brakes are being applied in the foregoing manner the reservoir 52 is being charged at whatever pressure determined by the setting of the brake valve 18. Now if it is desired to release the brakes, the operator merely returns the handle 24 to the release position in which case the outlet 22 of the brake valve is cut off from the main reservoir 2 by ball check 65 and the outlet 22 is connected via the ball and seat valve check 67 to an exhaust port 144 to thereby exhaust the air in the pipe 26 and relieve the pressure acting against the face of the piston 32 of the air relay 28. Relieving the air pressure against the face of the piston 32 allows it to move to its lowermost position so that the outlet 36 is connected to the exhaust port 122 of the air relay 28 and the exhaust port 36 is cut off from the inlet port 34 by closure of the valve 146 which as previously explained opens when air pressure is supplied to chamber 30. It will be observed, however, that the reservoir 52 remains charged because of the presence of the check valve 46. The pressure in this reservoir then will act via the piping 50 and 54 against the face of piston 58 holding the valve 60 off its seat so that air may be exhausted from the control pipe 66 via the ports 128, chamber 62, port 124, piping 44, 42 leading to outlet 36 communicating with exhaust port 122. The air under pressure in the reservoir 52 gradually bleeds off past the piston 58 via the bleed 148 so that after a sufficient time has elapsed to exhaust the control pipe 66 the piston 58 will be forced upwardly under the influence of a spring 150 to seat valve 60. The reason for this valve assembly 40 in combination with the choke assembly 46 and reservoir 52 then is to allow a predetermined time for the air to be exhausted from the control pipe 16 after which the valve assembly 40 acts as a check valve between control pipe 66 and air relay 28. The reason for this latter feature will appear in connection with the following description relative to the brake application at some point in the train remote from the front end thereof and made by other than the brake valve 18.

Let it be assumed that the conductor wishes to make a brake application on the car shown in Figure 1b. In such instance he will operate the handle 114 of the valve 108 to connect the brake pipe 12 to the control pipe 66. Without the presence of the valve assembly 40 the air which is supplied to control pipe 66 from the brake supply pipe 12 through the valve 108 would tend to be exhausted by the air relay 28 and proper braking could not be achieved on the car. With the presence of the valve assembly 40, however, operation of the valve 108 will allow air pressure to build up in the control tube 66 so as to operate the reverse relay 70 in the same manner described when the engineer made a brake application. If a brake application should be made with conductor's valve 108 (which is usually an emergency measure) the brake may be subsequently released by returning valve 108 to release or running position and waiting for the air in control pipe 66 to bleed off through bleed port 175 of valve 40. Alternatively the brakes may be released after returning conductor's valve 108 to the running position by making a momentary brake application with brake valve 18 at the head end of the train.

From the foregoing description it may now be appreciated that an air brake system has been provided which utilizes a relatively large brake supply pipe extending the length of the train which is fully charged with high pressure air and which may be kept fully charged at all times so that there is always a large supply of high pressure air available on each car making up the train to actuate the braking components and apply the brakes. On the other hand a relatively small control pipe is used at relatively low pressures to conduct signaling air which controls the relays of the system and which because of the small pressure and volume involved is easily and quickly charged throughout the length of the train. Furthermore, this control pipe is normally maintained exhausted during the running or released condition so that leakage and loss of air pressure do not occur under such condition. It will also be appreciated that during the running condition, that is, when the brake valve 18 is in the off position, air under equal pressure is applied to both the application cylinder 72 and the release cylinders 74 so as to positively disengage the brakes from the wheels of the cars to hold them cushioned in a positive way which assures that the brake shoes are disengaged thereby eliminating noise and chatter which accompanies brake rigging in which the shoes and levers move to some full abutting stop position or are left hanging adjacent the wheels.

I claim:

1. An airbrake system for a train comprising a pressure source, a trainline supply pipe running the length of said train and connected to said source, a control pipe running the length of said train which when exhausted effects release of the train brakes and when charged effects application thereof, an air conducting connection between said pipes manually operable to charge said control pipe from said trainline supply pipe, a valve assembly operable to connect said control pipe to said source to effect application of the train brakes and to disconnect said control pipe from said source and connect it to atmosphere to effect release thereof and including valve means responsive to brake release operation of said valve assembly to disconnect said control pipe from atmosphere after a predetermined interval of connection thereto.

2. An airbrake system for a train comprising a pressure source, a trainline supply pipe running the length of said train and connected to said source, a control pipe running the length of said train which when exhausted effects release of the train brakes and when charged effects application thereof, an air conducting connection between said pipes manually operable to charge said control pipe from said trainline supply pipe, a manually operated valve assembly and pressure operated valve means connected together in series with said source and control pipe, said pressure operated valve means including a valve normally biased to a closed position to disconnect said assembly from said control pipe, pressure responsive valve operating means connected to said valve, a pressure reservoir connected to said operating means, said reservoir also being connected to said assembly in parallel with said valve means, a one-way check valve preventing air flow from said reservoir into said assembly, said reservoir having air bleed means associated therewith, said valve assembly being operable to connect said valve means including said reservoir to said source to open said valve and thereby connect said source to said control pipe to effect application of the train brakes, said valve assembly being further operable to disconnect said valve means including said reservoir from said source and to connect said valve means to atmosphere and thereby connect said control pipe through said valve to atmosphere to effect release of the train brakes, said bleed means being effective to gradually exhaust said reservoir to thereby close said valve after a predetermined time so that a subsequent brake application can be made by manual operation of said air conducting connection.

References Cited in the file of this patent

UNITED STATES PATENTS

| | | |
|---|---|---|
| 446,908 | Wisner | Feb. 24, 1891 |
| 507,447 | Moyes | Oct. 24, 1893 |
| 1,091,416 | Wisner | Mar. 24, 1914 |
| 1,438,317 | Lewis | Dec. 12, 1922 |
| 1,657,530 | Farmer | Jan. 31, 1928 |
| 2,515,946 | Cadman | July 18, 1950 |
| 2,550,900 | Ainsworth | May 1, 1951 |